US011374454B2

(12) United States Patent
Kasai et al.

(10) Patent No.: US 11,374,454 B2
(45) Date of Patent: Jun. 28, 2022

(54) DYNAMO-ELECTRIC MACHINE HAVING COILS INSULATED BY SEMI-CONDUCTIVE LAYERS WITH RELEASE TREATMENT

(71) Applicant: Hitachi Industrial Products, Ltd., Tokyo (JP)

(72) Inventors: Yuuki Kasai, Tokyo (JP); Yuuichirou Yoshitake, Tokyo (JP); Hiroaki Kojima, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 119 days.

(21) Appl. No.: 16/964,420

(22) PCT Filed: Jan. 7, 2019

(86) PCT No.: PCT/JP2019/000106
§ 371 (c)(1),
(2) Date: Jul. 23, 2020

(87) PCT Pub. No.: WO2019/150886
PCT Pub. Date: Aug. 8, 2019

(65) Prior Publication Data
US 2021/0050758 A1 Feb. 18, 2021

(30) Foreign Application Priority Data

Jan. 31, 2018 (JP) .............................. JP2018-014389

(51) Int. Cl.
*H02K 3/40* (2006.01)
*H02K 3/34* (2006.01)
(52) U.S. Cl.
CPC ................. *H02K 3/40* (2013.01); *H02K 3/34* (2013.01)
(58) Field of Classification Search
CPC ............. H02K 3/40; H02K 3/34; H02K 3/487
(Continued)

(56) References Cited

U.S. PATENT DOCUMENTS

2009/0267441 A1* 10/2009 Hiramatsu ........... H02K 15/066
310/215
2015/0381005 A1* 12/2015 Kato ....................... H02K 3/40
310/196

FOREIGN PATENT DOCUMENTS

JP 57-55248 U 3/1982
JP 57055248 U * 3/1982 ............... H02K 3/40
(Continued)

OTHER PUBLICATIONS

Machine translation of JP-2015076906-A. (Year: 2015).*
(Continued)

*Primary Examiner* — Michael Andrews
(74) *Attorney, Agent, or Firm* — Crowell & Moring LLP

(57) ABSTRACT

A dynamo-electric machine with discharge reduced in a core slot without relation to a position of a stator coil placed in the core slot is provided. For that purpose, the present invention includes: a stator coil including a coil conductor and a main insulation layer covering a surface of the coil conductor; a core slot containing the stator coil; a first semiconducting layer that is placed between the stator coil and the core slot and is wrapped around and in contact with the main insulation layer; and a second semiconducting layer that is wrapped around the stator coil and in contact with the core slot, with the second semiconducting layer overlaid on the first semiconducting layer. The first semiconducting layer has a surface facing toward the core slot and a release layer is formed on the surface facing toward the core slot. The first semiconducting layer has electric connection with an inner peripheral surface of the core slot via the second semiconducting layer.

12 Claims, 3 Drawing Sheets

(58) Field of Classification Search
USPC .................................................. 310/196, 215
See application file for complete search history.

(56) References Cited

FOREIGN PATENT DOCUMENTS

| | | | | |
|---|---|---|---|---|
| JP | 2015-76906 A | 4/2015 | | |
| JP | 2015076906 A | * | 4/2015 | ............... H02K 3/34 |

OTHER PUBLICATIONS

Machine translation of JP-57055248-U. (Year: 1982).*
International Search Report (PCT/ISA/210) issued in PCT Application No. PCT/JP2019/000106 dated Feb. 19, 2019 with English translation (two (2) pages).
Japanese-language Written Opinion (PCT/ISA/237) issued in PCT Application No. PCT/JP2019/000106 dated Feb. 19, 2019 (five (5) pages).

* cited by examiner

DYNAMO-ELECTRIC MACHINE HAVING COILS INSULATED BY SEMI-CONDUCTIVE LAYERS WITH RELEASE TREATMENT

TECHNICAL FIELD

The present invention relates to a dynamo-electric machine such as an electric motor and an induction machine.

BACKGROUND ART

There is need for an increase in efficiency in the dynamo-electric machinery such as an electric motor, a generator, and an induction machine, and the dynamo-electric machine is controlled by a drive circuit using a semiconductor switching device such as an inverter. The dynamo-electric machine has a problem of concentrated discharge locally occurring from stator coils toward a stator core. In particular, in cases where a dynamo-electric machine is controlled by a drive circuit using a semiconductor switching device such as an inverter, a steep surge voltage is generated at the time of switching of the inverter, and thus concentrated discharge from the stator coils toward the stator core becomes apparent. This concentrated discharge causes the progress of discharge degradation of materials. Insulation coordination for the dynamo-electric machine becomes increasingly important for suppression of the discharge degradation of materials.

An effective technique to increase the insulation coordination for the dynamo-electric machine is that a semiconducting layer is provided on a stator coil of the dynamo-electric machine. As such a technique, for example, PTL 1 is included. In the technique disclosed in FIG. 3 in PTL 1, two different sheets of insulating paper are placed on top of another and wrapped around a stator coil inserted into a core slot, and a stator coil facing side of the insulating paper placed on the stator coil side and a core facing side of the insulating paper placed on the stator core side are coated with the semiconducting layers, respectively. In PTL 1, a leakage current path is formed continuously from main insulation of the stator coil to the slot in order to suppress the discharge degradation of materials.

CITATION LIST

Patent Literature

PTL 1: Japanese Patent Application Laid-Open No. 2015-76906

SUMMARY OF INVENTION

Technical Problem

A stator coil is inserted into a core slot of a stator core, with the stator coil wrapped with two different stacked sheets of insulating paper on which semiconducting layers are formed. The stator coil and the two different sheets of insulating paper on which the semiconducting layers are formed are desirably inserted approximately in parallel to the inside surface of the core slot. In particular, the insulating paper having the semiconducting layer placed on the outermost periphery of the stator coil is desirably placed to make contact with a large area of the inside surface of the core slot.

In a large size dynamo-electric machine, the stator coil to be inserted into the core slot increases in length, and also the distance ranging from a certain core slot to another core slot is longer. Therefore, in the large size dynamo-electric machine, in the process of inserting the stator coil into the core slot, distortion may occur in the stator coil, and thus the stator coil may be placed at an angle to the inside surface of the core slot. The placement of the stator coil at angle to the inside surface of the core slot may raise the possibility that the two different sheets of the insulating paper with the semiconducting layers formed thereon will be placed at an angle to the inside surface of the core slot. Thus, the contact area between the inside surface of the core slot and the insulating paper having the semiconducting layer placed on the outermost periphery of the stator coil is small, and concentrated discharge may be caused.

Accordingly, the present invention addresses the above problems and it is an object of the present invention to provide a dynamo-electric machine in which discharge is reduced in a core slot without relation to a position of a stator coil placed in the core slot.

Solution to Problem

In order to achieve the above object, an aspect of the present invention provides a dynamo-electric machine including: a stator coil including a coil conductor and a main insulation layer covering a surface of the coil conductor; a core slot containing the stator coil; a first semiconducting layer that is placed between the stator coil and the core slot and is wrapped around and in contact with the main insulation layer; and a second semiconducting layer that is wrapped around the stator coil and in contact with the core slot, with the second semiconducting layer overlaid on the first semiconducting layer, wherein the first semiconducting layer has a surface facing toward the core slot and subjected to release treatment, and the first semiconducting layer has electric connection with an inner peripheral surface of the core slot via the second semiconducting layer.

Another aspect of the present invention provides a dynamo-electric machine including: a stator coil including a coil conductor and a main insulation layer covering a surface of the coil conductor; a core slot containing the stator coil; and a semiconducting layer that is placed between the stator coil and the core slot and is wrapped at least two turns around the core slot, wherein the semiconducting layer has surfaces facing each other and subjected to release treatment, and the stator coil and an inner peripheral surface of the core slot are electrically connected through the semiconducting layer.

Advantageous Effects of Invention

According to the present invention, it is possible to provide a dynamo-electric machine in which discharge is reduced in a core slot without relation to a position of a stator coil placed in the core slot.

DESCRIPTION OF EMBODIMENTS

Examples of a dynamo-electric machine according to the present invention will now be described with reference to the accompanying drawings. The present invention is not limited to the following examples and is intended to embrace various modifications and applications that fall within the technical concept of the invention.

Example 1

Figure 1:
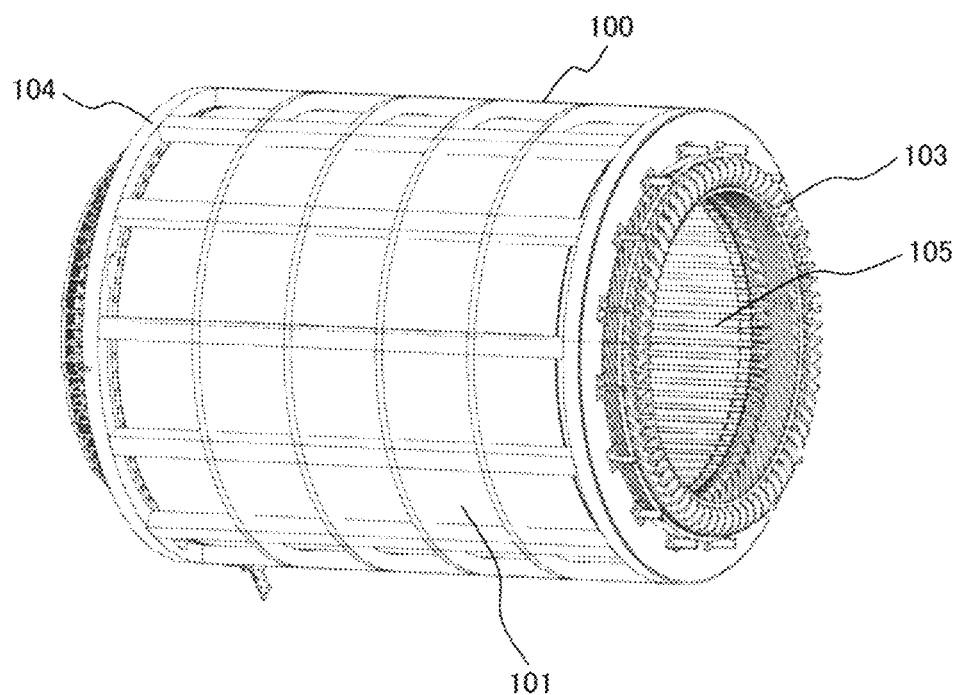
FIG. 1 is an overall perspective view illustrating a stator of a dynamo-electric machine according to an example of the present invention.
Figure 2:
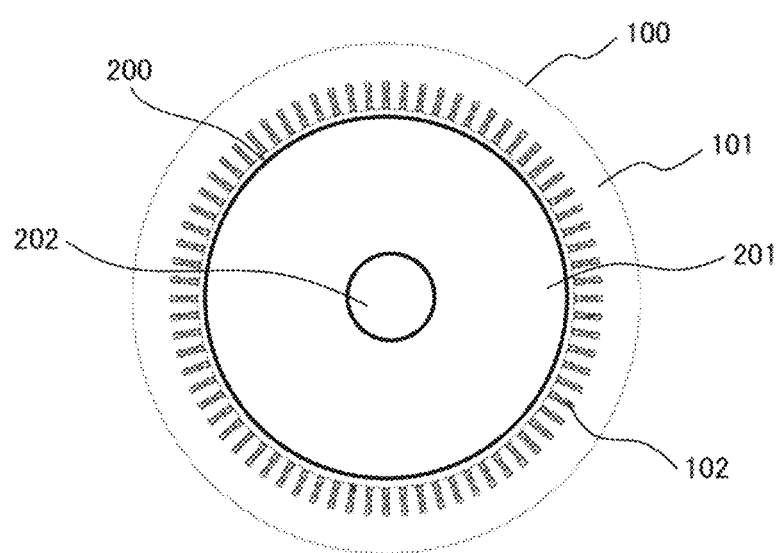
FIG. 2 is an axial sectional view of a dynamo-electric machine according to an example of the present invention.

A first example according to the present invention will be described with reference to FIG. 1 to FIG. 3. FIG. 1 is an overall perspective view illustrating a stator of a dynamo-electric machine according to an example of the present invention. FIG. 2 is an axial sectional view of a dynamo-electric machine according to an example of the present invention. FIG. 1 and FIG. 2 are common to all the examples.

In FIG. 1 and FIG. 2, a stator 100 includes: a stator core 101 formed by laminating a plurality of electromagnetic steel sheets; a plurality of core slots 102 formed in the stator core 101; stator coils 103 placed in the plurality of core slots 102; and a stator frame 104 supporting the outside diameter side of the stator core 101. The stator coil 103 is composed of a bundle of plural wires. Each of the core slots 102 is formed to be recessed from an opening on the radially inner side toward the radially outside. The core slot 102 is also formed to extend in the axial direction of the stator core 101. Wedges 105 are provided at the opening of the core slot 102 to prevent the stator coil 103 from falling out.

A rotor 200 is placed on the inner peripheral side of the stator 100. The rotor 200 includes: a rotor core 201 formed by laminating a plurality of electromagnetic steel sheets; and a rotating shaft 202 installed in a central portion of the rotor core 201. The rotating shaft 202 is supported rotatably by a bearing which is not shown. The rotor core 201 is placed inside the stator core 101 to leave a gap, and the rotor core 201 is rotatably supported. The dynamo-electric machine is essentially made up of the stator 100 and the rotor 200.

The example is described using an example of application to an industrial-use dynamo-electric machine with the stator having as long an axial length as several meters. Also, a type of the dynamo-electric machine is assumed as a two-pole induction motor which achieves high rotation.

A large size dynamo-electric machine for industrial use includes a stator core having a long length in some meter units, and accordingly, the stator coil 103 contained in the core slot 102 of the stator core 101 is longer based on the length of the stator core. Also, the stator coil 103 placed in a certain core slot 102 is placed to span the certain core slot 102 and another core slot 102.

For inserting the stator coil 103 into the core slots 102 of the stator core 101, a sheet with a semiconducting layer formed thereon is wrapped around the outer periphery of the stator coil 103 before the stator coil 103 is inserted. The stator coil 103 and the sheet with the semiconducting layer formed thereon are desirably inserted approximately in parallel to the inside surface of the core slot 102. In particular, the sheet with the semiconducting layer placed on the outermost periphery of the stator coil 103 is preferably placed to come into contact with a large area of the inside surface of the core slot 102. In the large size dynamo-electric machine described above, the stator coil 103 inserted into the core slots 102 increases in length and also the distance from a certain core slot 102 to another core slot 102 is longer. Therefore, in the large size dynamo-electric machine, in the process of inserting the stator coil 103 into the core slots 102, distortion may occur in the stator coil 103, and thus the stator coil 103 may be placed at an angle to the inside surface of the core slot 102. And, the sheet with the semiconducting layer placed on the outermost periphery of the stator coil 103 is located along the distortion of the stator coil 103, so that the contact area with the core slot 102 is decreased, and there was a possibility of concentrated discharge being caused. Means for reducing the concentrated discharge is described with reference to FIG. 3.

Figure 3:
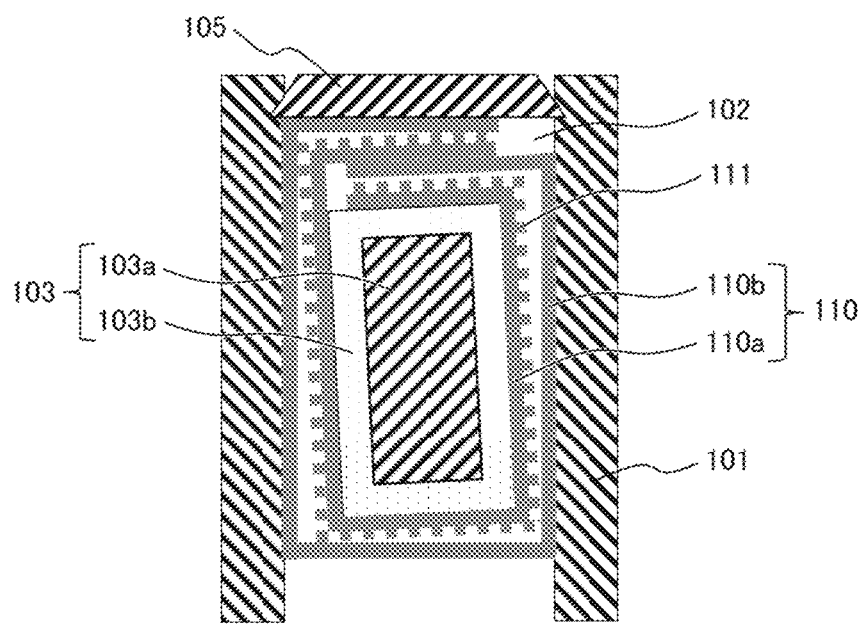
FIG. 3 is a partial sectional view illustrating the relationship between a stator coil and a core slot according to a first example of the present invention.

FIG. 3 is a partial sectional view illustrating the relationship between the stator coil and the core slot according to the first example of the present invention. The stator coil 103 according to the example includes: a coil conductor 103a to be energized; and a main insulation layer 103b covering the surface of the coil conductor 103a for insulation. A first semiconducting layer 110a is placed on the outer periphery of the stator coil 103 to be wrapped around and in contact with the main insulation layer 103b of the stator coil 103. The semiconducting layer 110 according to the example is made up of a first semiconducting layer 110a and a second semiconducting layer 110b. The first semiconducting layer 110a is formed by coating one surface or both surfaces of a sheet-shaped member with semiconductive coating material. Also, a release layer 111 subjected to release treatment is applied to one surface of the sheet-shaped member. The release layer 111 is formed by coating the sheet-shaped member with silicon resin. And, the first semiconducting layer 110a is formed on one of the surfaces of the sheet-shaped member, and the release layer 111 is formed on the other surface (the reverse surface) of the sheet-shaped member. The release layer 111 is situated on the side facing toward the stator core 101 (core slot 102).

Also, the second semiconducting layer 110b is located on the outside of the release layer 111. The second semiconducting layer 110b is formed by coating one surface or both surfaces of a sheet-shaped member with semiconductive coating material.

In a case where one surface of the sheet-shaped member is coated with the semiconductive coating material, the side facing toward the stator core 101 (core slot 102) is coated. The second semiconducting layer 110b is inserted into the core slot 102 and comes into contact with the stator core 101, under conditions where the second semiconducting layer 110b is overlaid on the first semiconducting layer 110a and wrapped around the stator coil 103. The wedge 105 is placed on the stator core 101 to block an opening of the core slot 102 in order to prevent the stator coil 103 from falling out.

The first semiconducting layer 110a and the release layer 111 start being wrapped from the core slot 102 opening side (upper area of FIG. 3) of the stator coil 103, and then, after being wrapped one turn around the outer periphery of the stator coil 103, overlap and finish being wrapped on the opening side of the core slot 102. A wrapping end portion of the first semiconducting layer 110a and release layer 111 is situated on the outer periphery side of a wrapping start portion to form an outer periphery side end region. Likewise, the second semiconducting layer 110*b* starts being wrapped from the core slot 102 opening side (upper area of FIG. 3) of the stator coil 103, and then, after being wrapped one turn around the outer periphery of the stator coil 103, overlaps and finishes being wrapped at the core slot 102 opening side of the stator coil 103. A wrapping start portion of the second semiconducting layer 110*b* is placed in the form of being sandwiched between the release layer 111 and a wrapping end of the first semiconducting layer 110*a* to form an inner periphery side end region.

By such placement, the outer periphery side end region of the first semiconducting layer 110*a* wrapped around the stator coil 103, and the inner periphery side end region of the second semiconducting layer 110*b* wrapped around the stator coil 103 have faces in contact with each other without involving the release layer 111, and the faces in question and a face of the second semiconducting layer 110*b* touching the stator core 101 are able to form an electrically conductive path. The first semiconducting layer 110*a* and the second semiconducting layer 110*b* are electrically connected to each other on the opening side of the core slot 102.

In the example, the first semiconducting layer 110*a* is formed on one surface of a sheet-shaped member, and the release layer 111 is formed on the other surface (the reverse surface) of the sheet-shaped member. That is, the release layer 111 is formed between the first semiconducting layer 110*a* and the second semiconducting layer 110*b*. The release layer 111 inhibits the adhesion between the first semiconducting layer 110*a* and the second semiconducting layer 110*b*. Because of the release layer 111, the second semiconducting layer 110*b* is broadened outward away from the first semiconducting layer 110*a* to touch the stator core 101. At this time, the second semiconducting layer 110*b* has an increased contact area with the stator core 101. Because of this, in the process of inserting the stator coil 103 into the core slot 102, even if distortion occurs in the stator coil 103, and thus the stator coil 103 is placed at an angle to the inside surface of the core slot 102, without following the distortion, the second semiconducting layer 110*b* can be located away from the first semiconducting layer 110*a* to touch the stator core 101.

Because the wedge 105 is placed at the opening of the core slot 102, the stator coil 103, the semiconducting layer 110 (the first semiconducting layer 110*a*, the second semiconducting layer 110*b*) are strongly held into the core slot 102 to establish a robust electrical contact within the core slot 102, and an electrically conductive path can be formed among the stator coil 103, the first semiconducting layer 110*a*, the second semiconducting layer 110*b*, and the stator core 101. The first semiconducting layer 110*a* in contact with the stator coil 103 has electric connection with the stator core 101 (the inner peripheral surface of the core slot 102) via the second semiconducting layer 110*b*.

Further, because the release layer 111 causes the first semiconducting layer 110*a* and the second semiconducting layer 110*b* to be placed in a noncontact state, a rise in temperature of the stator coil 103 is reduced. Thus, the main insulation layer 103*b* can be inhibited from falling off due to heat produced by the stator coil 103.

According to the example, because the release layer 111 is located between the first semiconducting layer 110*a* and the second semiconducting layer 110*b*, the contact area between the second semiconducting layer 110*b* and the stator core 101 can be increased, and discharge can be reduced in the core slot 102 without relation to a position of the stator coil 103 placed in the core slot 102.

Example 2

Figure 4:
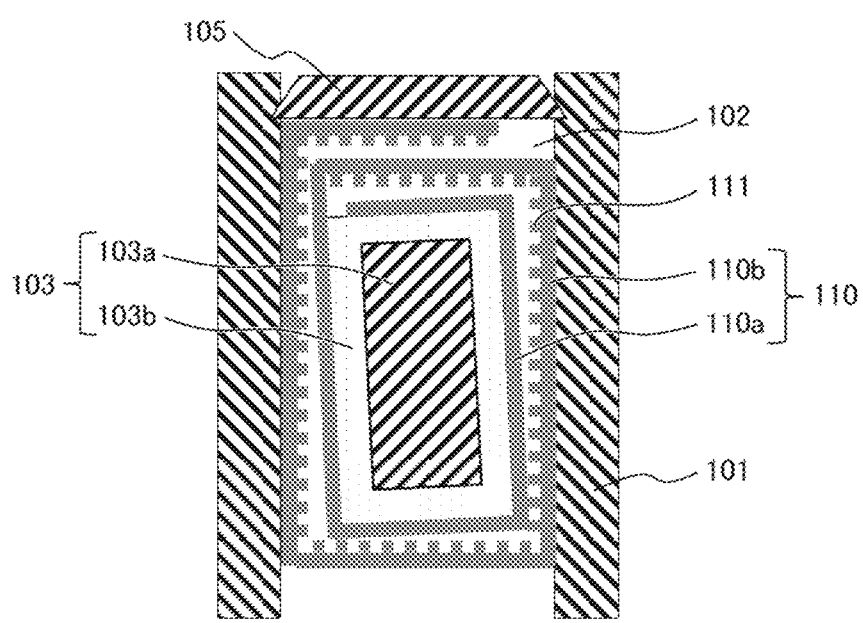
FIG. 4 is a partial sectional view illustrating the relationship between a stator coil and a core slot according to a second example of the present invention.
Figure 5:
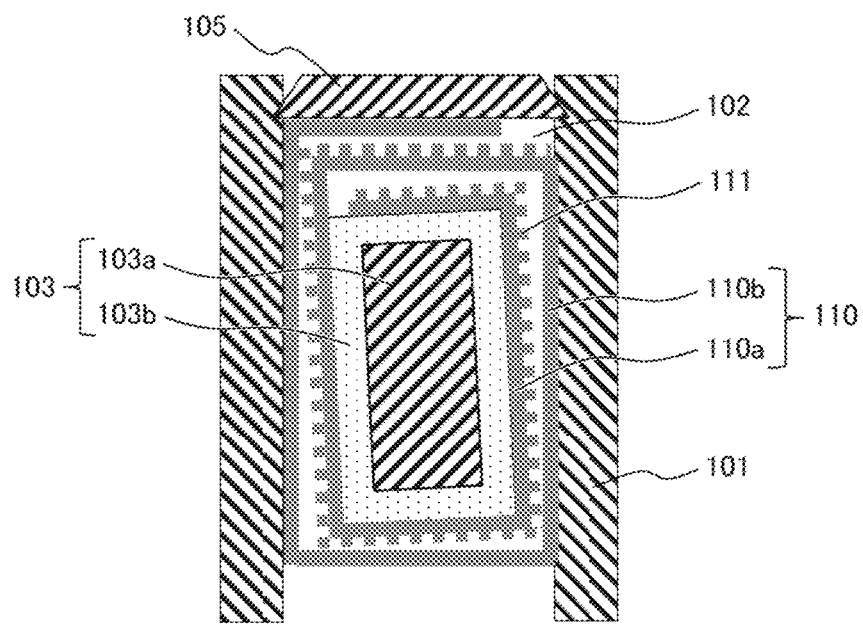
FIG. 5 is a partial sectional view illustrating the relationship between the stator coil and the core slot according to the second example of the present invention.

A second example according to the present invention will be described below with reference to FIG. 4 and FIG. 5. Like reference signs are used to designate common configurations with the first example. The second example differs from the first example in that a single sheet-shaped member is employed. FIG. 4 and FIG. 5 are partial sectional views illustrating the relationship between a stator coil and a core slot according to the second example of the present invention.

The stator coil 103 according to the example includes: a coil conductor 103*a* to be energized; and a main insulation layer 103*b* covering the surface of the coil conductor 103*a* for insulation. A semiconducting layer 110 is placed on the outer periphery of the stator coil 103 to be wrapped at least two or more turns around the main insulation layer 103*b* of the stator coil 103.

In the example, of the semiconducting layer 110, a portion defined as a first semiconducting layer 110*a* faces the main insulation layer 103*b* of the stator coil 103 and a portion defined as a second semiconducting layer 110*b* overlaps the first semiconducting layer 110*a* and ranges from the core slot 102 opening side on the second turn (upper area of FIG. 4) to a wrapping end portion. The first semiconducting layer 110*a* and the second semiconducting layer 110*b* are formed by coating both surfaces of a sheet-shaped member with semiconductive coating material. Also, a release layer 111 subjected to release treatment is provided on a portion of the sheet-shaped member. The release layer 111 is formed by coating the sheet-shaped member with silicon resin.

The release layer 111 may be provided on at least one of surfaces of the semiconducting layer 110 facing each other, for example. In FIG. 4, the release layer 111 is provided on the second semiconducting layer 110*b*. In FIG. 5, the release layer 111 is provided on the first semiconducting layer 110*a* and a portion of the second semiconducting layer 110*b* located on the opening side of the core slot 102 (upper area of FIG. 5).

In the example, the first semiconducting layer 110*a* and the second semiconducting layer 110*b* are formed continuously on a sheet-shaped member. Also, the release layer 111 is formed on the first semiconducting layer 110*a* or the second semiconducting layer 110*b*. That is, the release layer 111 is formed between the first semiconducting layer 110*a* and the second semiconducting layer 110*b*. The release layer 111 inhibits the adhesion between the first semiconducting layer 110*a* and the second semiconducting layer 110*b*. Because of the release layer 111, the second semiconducting layer 110*b* is broadened outward away from the first semiconducting layer 110*a* to touch the stator core 101. At this time, the second semiconducting layer 110*b* has an increased contact area with the stator core 101.

Because of this, in the process of inserting the stator coil 103 into the core slot 102, even if distortion occurs in the stator coil 103, and thus the stator coil 103 is placed at an angle to the inside surface of the core slot 102, without following the distortion, the second semiconducting layer 110*b* can be located away from the first semiconducting layer 110*a* to touch the stator core 101.

Also, because a wedge 105 is placed at the opening of the core slot 102, the stator coil 103 and the semiconducting layer 110 (the first semiconducting layer 110*a*, the second semiconducting layer 110*b*) are strongly held into the core slot 102 to establish a robust electrical contact within the core slot 102, and an electrically conductive path can be formed among the stator coil 103, the semiconducting layer 110 (the first semiconducting layer 110a, the second semiconducting layer 110b), and the stator core 101. The first semiconducting layer 110a in contact with the stator coil 103 has electric connection with the stator core 101 (the inner peripheral surface of the core slot 102) via the second semiconducting layer 110b.

Further, because the release layer 111 causes the first semiconducting layer 110a and the second semiconducting layer 110b to be placed in a noncontact state, a rise in temperature of the stator coil 103 is reduced. Thus, the main insulation layer 103b can be inhibited from falling off due to heat produced by the stator coil 103.

According to the example, because the release layer 111 is provided between the first semiconducting layer 110a and the second semiconducting layer 110b, the contact area between the second semiconducting layer 110b and the stator core 101 is increased and discharge is reduced in the core slot 102 without relation to a position of the stator coil 103 placed in the core slot 102.

Also, according to the example, the first semiconducting layer 110a and the second semiconducting layer 110b are included in the semiconducting layer 110 formed continuously on a single sheet-shaped member. Because of this, a reduction in manufacturing costs for the semiconducting layer 110 can be achieved.

Example 3

Figure 6:
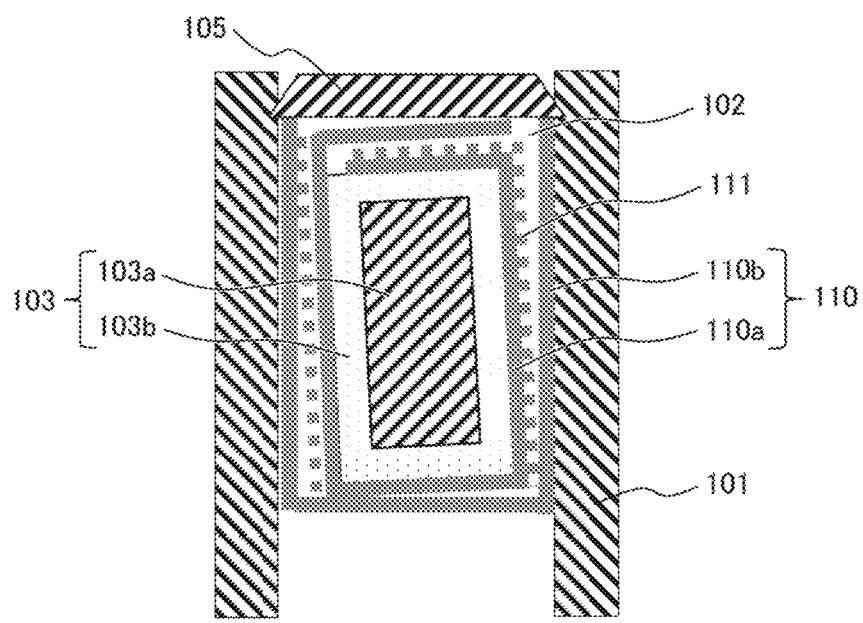
FIG. 6 is a partial sectional view illustrating the relationship between a stator coil and a core slot according to a third example of the present invention.

A third example according to the present invention will now be described with reference to FIG. 6. Like reference signs are used to designate common configurations with the first example and the second example. The third example differs from the first example in that no semiconducting layer is provided on the surface on the wedge 105 side of the second semiconducting layer 110b. The third example also differs from the first example in that the release layer 111 is not provided on the opposite side of the second semiconducting layer 110b from the wedge 105. FIG. 6 is partial sectional views illustrating the relationship between a stator coil and a core slot according to the third example of the present invention.

A semiconducting layer 110 according to the example is composed of a first semiconducting layer 110a and a second semiconducting layer 110b. The first semiconducting layer 110a is placed on the outer periphery of the stator coil 103 to be wrapped around and in contact with the main insulation layer 103b of the stator coil 103. The first semiconducting layer 110a is formed by coating one surface or both surfaces of a sheet-shaped member with semiconductive coating material. Also, a release layer 111 subjected to release treatment is applied to a portion of one surface of the sheet-shaped member. The release layer 111 is formed by coating the sheet-shaped member with silicon resin. And, the first semiconducting layer 110a is formed on one surface of the sheet-shaped member, and the release layer 111 is formed on a portion of the other surface (the reverse surface) of the sheet-shaped member. The release layer 111 is situated on the side facing toward the stator core 101 (core slot 102).

Also, the second semiconducting layer 110b is located on the outer side of the release layer 111. The second semiconducting layer 110b is formed by coating both surfaces of a sheet-shaped member with semiconductive coating material. The second semiconducting layer 110b is inserted into the core slot 102 and comes into contact with the stator core 101, under conditions where the second semiconducting layer 110b is overlaid on the first semiconducting layer 110a and wrapped around the stator coil 103. The wedge 105 is placed on the stator core 101 to block an opening of the core slot 102 in order to prevention the stator coil 103 from falling out.

The first semiconducting layer 110a starts being wrapped from the core slot 102 opening side (upper area of FIG. 6) of the stator coil 103, and then is wrapped one turn around the outer periphery of the stator coil 103, before overlapping and finishing being wrapped on the opening side of the core slot 102.

The second semiconducting layer 110b covers a part of the outer periphery of the stator coil 103. The second semiconducting layer 110b starts being wrapped from the right side face of the stator coil 103 (the right side of FIG. 6), and then passes below the stator coil 103 (on the insertion side), and then finishes being wrapped on the left side face of the stator coil 103 (the left side of FIG. 6). In other words, the second semiconducting layer 110b is situated on both side faces of the stator coil 103 facing toward the core slot 102 and on the opposite side to the opening.

The release layer 111 subjected to release treatment on the first semiconducting layer 110a is formed (treated with release) on both side surfaces facing toward at least the stator core 101 (core slot 102), of the surfaces of the first semiconducting layer 110a and the second semiconducting layer 110b that face each other. Further, in the example, the release layer 111 is formed on a portion of the first semiconducting layer 110a overlapping another portion of itself (upper area of FIG. 6).

By such placement, a lower region of the first semiconducting layer 110a wrapped around the stator coil 103, and a lower region of the second semiconducting layer 110b wrapped around the stator coil 103 have a portion in contact with each other without involving the release layer 111, and the portion in question and a portion of the second semiconducting layer 110b touching the stator core 101 are able to form an electrically conductive path. The first semiconducting layer 110a and the second semiconducting layer 110b are electrically connected to each other at a position on the opening side of the core slot 102.

In the example, the first semiconducting layer 110a is formed on one surface of a sheet-shaped member, and the release layer 111 is formed on both side surfaces facing toward at least the stator core 101 (core slot 102), of the surfaces of the first semiconducting layer 110a and the second semiconducting layer 110b that face each other. The release layer 111 inhibits the adhesion between the first semiconducting layer 110a and the second semiconducting layer 110b. Because of the release layer 111, the second semiconducting layer 110b is broadened outward away from the first semiconducting layer 110a to touch the stator core 101. At this time, the second semiconducting layer 110b has an increased contact area with the stator core 101. Because of this, in the process of inserting the stator coil 103 into the core slot 102, even if distortion occurs in the stator coil 103, and thus the stator coil 103 is placed at an angle to the inside surface of the core slot 102, without flowing the distortion, the second semiconducting layer 110b can be located away from the first semiconducting layer 110a to touch the stator core 101.

Also, because the wedge 105 is placed at the opening of the core slot 102, the stator coil 103, the semiconducting layer 110 (the first semiconducting layer 110a, the second semiconducting layer 110b) are strongly held into the core slot 102 to establish a robust electrical contact within the core slot 102, and an electrically conductive path can be formed among the stator coil 103, the first semiconducting layer 110a, the second semiconducting layer 110b, and the stator core 101. The first semiconducting layer 110a in contact with the stator coil 103 has electric connection with the stator core 101 (the inner peripheral surface of the core slot 102) via the second semiconducting layer 110b.

Further, because the release layer 111 causes the first semiconducting layer 110a and the second semiconducting layer 110b to be placed in a noncontact state, a rise in temperature of the stator coil 103 is reduced. Thus, the main insulation layer 103b can be inhibited from falling off due to heat produced by the stator coil 103.

According to the example, because the release layer 111 is provided between the first semiconducting layer 110a and the second semiconducting layer 110b, the contact area between the second semiconducting layer 110b and the stator core 101 is increased and thus discharge is reduced in the core slot 102 without relation to a position of the stator coil 103 placed in the core slot 102.

In the example, also, even in the structure with electric connections between the stator coil 103 and the stator core 101, space for a single semiconducting layer can be saved on the wedge side of the second semiconducting layer 110b. Because of this, even if the space allowance for insertion of the stator coil 103 is small, the insertion of the stator coil 103 into the core slot 102 is facilitated.

It should be understood that the present invention is not limited to the above examples and embraces various modifications.

The above examples have been described and explained in detail in order to provide a better understanding of the present invention, and the present invention is not necessarily limited to include all the configurations described above.

REFERENCE SIGNS LIST

- 100 . . . stator
- 101 . . . stator core
- 102 . . . core slot
- 103 . . . stator coil
- 103a . . . coil conductor
- 103b . . . main insulation layer
- 104 . . . stator frame
- 105 . . . wedge
- 110 . . . semiconducting layer
- 110a . . . first semiconducting layer
- 110b . . . second semiconducting layer
- 111 . . . release layer
- 200 . . . rotor
- 201 . . . rotor core
- 202 . . . rotating shaft

The invention claimed is:

1. A dynamo-electric machine comprising:
   a stator coil including a coil conductor and a main insulation layer covering a surface of the coil conductor;
   a core slot containing the stator coil;
   a first semiconducting layer that is placed between the stator coil and the core slot and is wrapped around and in contact with the main insulation layer, the first semiconducting layer having a release layer disposed thereon; and
   a second semiconducting layer that is wrapped around the stator coil and in contact with the core slot, under conditions where a beginning of wrapping of the second semiconducting layer is positioned on an inner periphery side of the first semiconducting layer and also the beginning of wrapping of the second semiconducting layer is overlaid on an ending of wrapping of the first semiconducting layer,
   wherein the release layer is disposed on a surface of the first semiconducting layer facing toward the core slot and the first semiconducting layer has electric connection with an inner peripheral surface of the core slot via the second semiconducting layer; and
   wherein the release layer is disposed only on portions of the first semiconducting layer that are not in contact with a stator core of the dynamo-electric machine.

2. The dynamo-electric machine according to claim 1, wherein the first semiconducting layer and the second semiconducting layer are formed by coating sheet-shaped members with semiconductive coating material.

3. The dynamo-electric machine according to claim 2, wherein the release layer includes silicon resin.

4. The dynamo-electric machine according to claim 1, wherein the first semiconducting layer and the second semiconducting layer are electrically connected to each other on an opening side of the core slot.

5. The dynamo-electric machine according to claim 4, comprising a wedge placed on the opening side of the core slot.

6. The dynamo-electric machine according to claim 1, wherein the second semiconducting layer is located on both side surfaces facing the core slot and on the opposite side to an opening.

7. The dynamo-electric machine according to claim 6, wherein the first semiconducting layer and the second semiconducting layer are electrically connected to each other at a position on the opposite side to the opening of the core slot.

8. The dynamo-electric machine according to claim 1, wherein the dynamo-electric machine is as a two-pole induction motor.

9. A dynamo-electric machine comprising:
   a stator coil including a coil conductor and a main insulation layer covering a surface of the coil conductor;
   a core slot containing the stator coil; and
   a single semiconducting layer that is placed between the stator coil and the core slot and is wrapped at least two turns around the core slot, the single semiconducting layer having a release layer disposed on a surface thereof;
   wherein the single semiconducting layer has surfaces facing each other, and the stator coil and an inner peripheral surface of the core slot are electrically connected through the single semiconducting layer.

10. The dynamo-electric machine according to claim 9, wherein the single semiconducting layer is formed by coating a sheet-shaped member with semiconductive coating material.

11. The dynamo-electric machine according to claim 10, wherein the release layer includes silicon resin.

12. The dynamo-electric machine according to claim 2, wherein the dynamo-electric machine is as a two-pole induction motor.

* * * * *